US008007212B2

(12) United States Patent
Zaiser et al.

(10) Patent No.: US 8,007,212 B2
(45) Date of Patent: Aug. 30, 2011

(54) ROUTER

(75) Inventors: Adolf Zaiser, Koengen (DE); Heiko Roehm, Stuttgart (DE); Jens Blum, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 934 days.

(21) Appl. No.: 11/930,894

(22) Filed: Oct. 31, 2007

(65) Prior Publication Data

US 2008/0152449 A1 Jun. 26, 2008

(30) Foreign Application Priority Data

Dec. 22, 2006 (DE) ........................ 10 2006 061 241

(51) Int. Cl.
*B23C 1/20* (2006.01)
*B27C 5/10* (2006.01)

(52) U.S. Cl. ........ 409/182; 409/184; 409/210; 409/218; 144/136.95

(58) Field of Classification Search .................. 409/182, 409/181, 184–185, 204, 206, 210, 214, 218; 144/154.5, 136.95; 408/129, 137
See application file for complete search history.

(56) References Cited

U.S. PATENT DOCUMENTS

| | | | | |
|---|---|---|---|---|
| 3,207,193 | A * | 9/1965 | Godfrey et al. | 144/144.1 |
| 4,606,685 | A * | 8/1986 | Maier et al. | 409/137 |
| 4,770,573 | A * | 9/1988 | Monobe | 409/182 |
| 4,938,642 | A * | 7/1990 | Imahashi et al. | 409/182 |
| 5,094,575 | A * | 3/1992 | Kieser et al. | 409/182 |
| 5,273,089 | A | 12/1993 | Fuchs et al. | |
| 5,310,296 | A * | 5/1994 | McCurry | 409/182 |
| 5,346,342 | A * | 9/1994 | Winchester | 409/134 |
| 6,024,144 | A * | 2/2000 | Qian | 144/252.1 |
| 6,182,723 | B1 | 2/2001 | Bosten et al. | |
| 6,725,892 | B2 * | 4/2004 | McDonald et al. | 144/136.95 |
| 6,863,480 | B1 | 3/2005 | Taylor | |
| 2005/0006000 | A1 * | 1/2005 | Freese et al. | 144/136.95 |
| 2006/0086417 | A1 | 4/2006 | Griffin et al. | |
| 2006/0248927 | A1 | 11/2006 | Meneghin et al. | |
| 2006/0280570 | A1 | 12/2006 | Taylor | |
| 2008/0149223 | A1 * | 6/2008 | Zaiser et al. | 144/154.5 |

FOREIGN PATENT DOCUMENTS

| | | |
|---|---|---|
| CN | 2352307 | 12/1999 |
| DE | 41 39 759 | 6/1993 |
| JP | 2001-239502 A * | 9/2001 |

* cited by examiner

*Primary Examiner* — Erica E Cadugan
(74) *Attorney, Agent, or Firm* — Michael J. Striker

(57) ABSTRACT

A router has a housing, from the underside of which a tool fitting for a milling tool connected with a drive extends, and a device for adjusting the milling depth, which is located in a tower of the housing, the device extending essentially in the direction of a vertical axis of the router and including an adjusting knob. It is provided that the device extends, at the maximum, to a plane formed by a top side of the housing.

13 Claims, 3 Drawing Sheets

Alternative Embodiment Wherein a Spring Connects the Adjusting Knob with the Neck of the Adjusting Device

FIG.3

ROUTER

CROSS-REFERENCE TO A RELATED APPLICATION

The invention described and claimed hereinbelow is also described in German Patent Application DE 102006061241.8 filed on Dec. 22, 2006. This German Patent Application, whose subject matter is incorporated here by reference, provides the basis for a claim of priority of invention under 35 U.S.C. 119(a)-(d).

BACKGROUND OF THE INVENTION

The present invention generally relates to routers.

A generic router is made known in DE 41 39 759 A1. The router includes a housing, from the underside of which a tool fitting for a milling tool extends. The housing is connected with a base plate via two guide columns. The router includes a rod that cooperates with a rotary plate to roughly adjust the milling depth. To make fine adjustments of the milling depth, the housing may also be raised or lowered slightly relative to a guide column using a device for adjusting the milling depth.

SUMMARY OF THE INVENTION

Accordingly, it is an object of the present invention to provide a router which is a further improvement of the existing routers.

The present invention is directed to a router with a housing, from the underside of which a tool fitting for a milling tool connected with a drive extends, and with a device for adjusting the milling depth, which is located in a tower of the housing, the device extending essentially in the direction of a vertical axis of the router and including an adjusting knob.

It is provided that the device extends, at the maximum, to a plane formed by a top side of the housing.

A design of this type permits the router to be turned upside down to replace or adjust the tool, thereby resulting in simple handling of the router, in particular with regard for tool replacement and adjustment. The router is also made more robust against being dropped or struck, since the device for adjusting the milling depth does not extend beyond the top side of the housing.

In a further embodiment, it is provided that the adjusting knob encloses the tower, at least partially. As a result, the adjusting knob requires relatively little space, thereby resulting in a compact design of the device. The adjusting knob is also made more resistant to being dropped or struck, since it does not extend beyond the top side of the housing and may be braced internally by the tower if the router is dropped.

It is furthermore provided that a rotating scale ring may be installed on the adjusting knob. This enables the milling depth to be read easily.

It is also provided that the housing is composed of two half shells, which are capable of being joined together, the parting plane of which extends essentially in the direction of a vertical axis of the router. As a result, the robustness of the router is increased and a compact design of the device is made possible, since good access to the device components is attained.

In a further embodiment, it is provided that the parting plane extends through the tower, onto which at least one clamping ring may be pressed. The clamping rings holds the half shells of the tower and the housing together. A complex device—which requires installation space—for holding the half shells together may therefore be eliminated.

It is furthermore provided that a clamping ring includes a scale zero line, which interacts with the rotating scale ring. A component that is required anyway to hold the half shells together is therefore advantageously used for another task as well. A separate and additional component may therefore be eliminated, which also saves installation space.

It is furthermore provided that the adjusting knob includes a grip rib. Since the adjusting knob extends nearly to a plane formed by a top side of the housing, it is difficult to rotate from the outside. To improve the handling of the rotary knob, it includes a means for applying force axially, in the form of the grip rib. Advantageously, the grip rib also simultaneously indicates the position of the adjusting knob. This results in a reliable adjustment without the operator needing to look at the scale, which is composed of the scale ring and the second clamping ring.

It is furthermore provided that a spring-loaded ball bush is installed underneath the grip rib, which may be snapped into holes that interact with the tower. Advantageously, the level of the depth adjustment may be determined in advance based on the distance between the holes. The snap-in connection serves simultaneously as a brake against an unintentional depth adjustment resulting from vibrations. In particular, the snap-in connection enables depth to be adjusted based on "feel", i.e., an adjustment may be carried out without the operator needing to read the rotating scale ring visually.

In a further embodiment it is provided that the holes are provided in a further clamping ring. A component that is required anyway to hold the half shells together is therefore advantageously used for another task as well. A separate and additional component may therefore be eliminated, which also saves installation space.

It is furthermore provided that the adjusting knob is connected via a screw or a spring with a neck of the device. The fastening means are advantageously located underneath the rib, which results in a space-saving design of the adjusting knob.

It is furthermore provided that the adjusting element is connected via an inner ring of the deep-groove ball bearing with the neck of the device. A separate connecting means may therefore be eliminated, which also saves installation space.

The novel features of which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows a schematic representation of an alternative embodiment wherein a spring connects the adjusting knob with the neck of the adjusting device.

DESCRIPTION OF THE PREFERRED EMBODIMENTS

Figure 1:
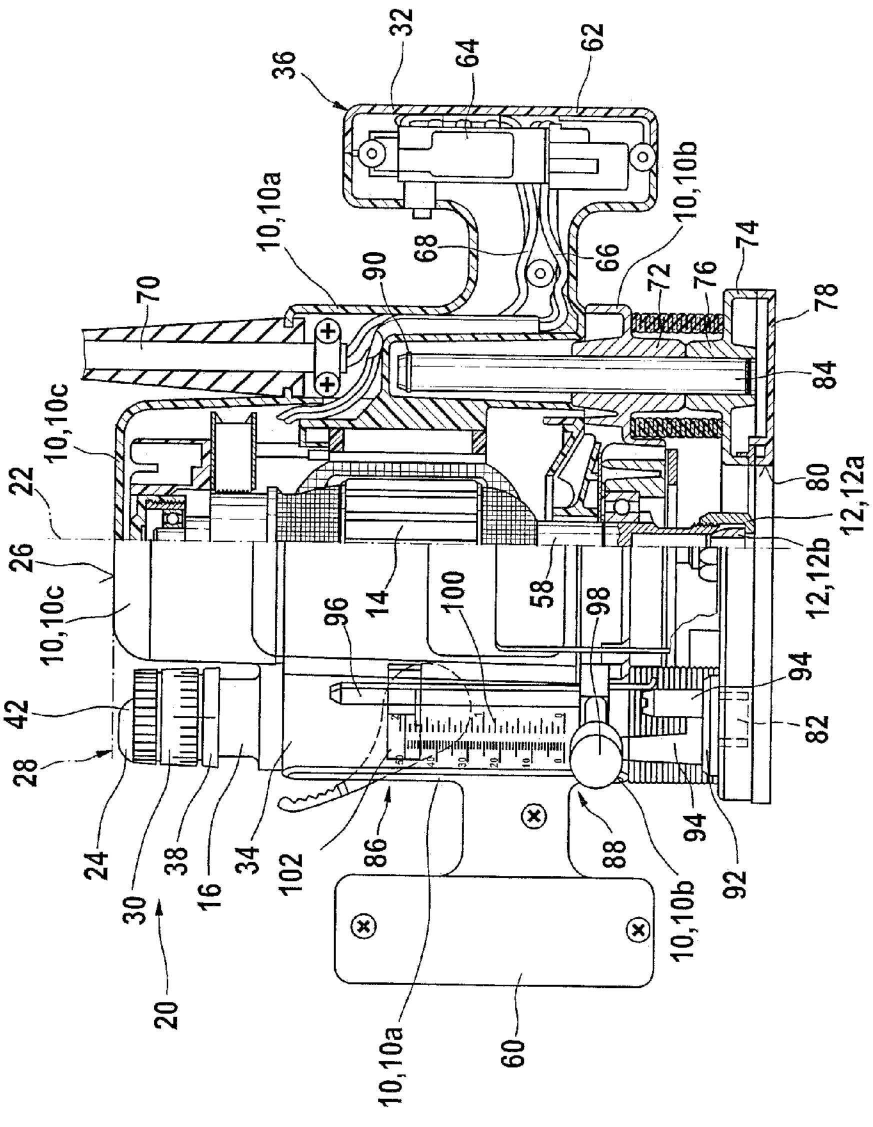
FIG. 1 shows a view of an inventive router as a partial sectional view, with a housing that includes a tower for receiving a device for making fine adjustments of the milling depth, and with a device for making rough adjustments of the milling depth.

FIG. 1 shows an inventive router in a partial sectional view. The router includes a housing 10, which is composed of an upper piece 10*a*, which is preferably made of plastic, a lower piece 10*b*, which is preferably made of aluminum, and a cover 10*c*. Further embodiments of housing 10, e.g., without a cover, are also feasible.

A drive motor 14, which starts a motor spindle 58 rotating, is located in housing 10. Motor spindle 58 is non-rotatably connected with a tool fitting 12, which is preferably designed as a clamping sleeve 12*b* that may be clamped using a hexagon nut 12*a* and that extends out of an underside of housing 10, and in which a milling tool may be clamped, in order to machine a work piece.

Housing 10 of the router includes at least one handle 60, 62, which is fixedly connected with housing 10. In the present exemplary embodiment, the router includes two handles 60 and 62, which are integrally moulded with upper piece 10*a* and are diametrically opposed to each other. Further alternatives are also feasible, however.

An electrical switch 64 for starting the router is provided in one of the two handles 62. Switch 64 is connected via electric lines 66, 68 with drive motor 14 and a power connection cord 70.

First guide tubes 72, which extend essentially parallel to a vertical axis 22 of the router and a vertical axis 22 of the milling tool, are integrally moulded with lower piece 10*b* of housing 10. First guide tubes 72 line up directly with second guide tubes 76, which are also oriented essentially parallel to a vertical axis 22 of the router and a vertical axis 22 of the milling tool, and which are integrally moulded with base plate 74.

Base plate 74 includes a lower piece 78—which is preferably composed of plastic—for protecting the work piece to be machined. Base plate 74 and lower piece 78 have a central opening 80, into which motor spindle 58 of drive motor 14 located in housing 10 extends at least partially.

Two guide columns 82, 84 of a guide unit are guided and supported in first and second guide tubes 72, 76. A first guide column 82, as the main column, is hollow in design, and a second guide column 84 is solid in design. Housing 10 is accommodated on guide columns 82, 84 such that it is displaceable essentially parallel to axis 22 of the milling tool, and it is detachably fixable relative to at least one of the guide columns 82, 84 using a clamping device 86, which is a component of a device 88 for making rough adjustment of the milling depth. A snap ring 90 is located in an annular groove on an upper end of solid guide column 84 facing upper piece 10*a*; it prevents housing 10 from accidentally sliding off of guide columns 82, 84. Solid guide column 84 prevents housing 10 from rotating, and serves to limit the upper extent of the reciprocating motion.

Figure 2:
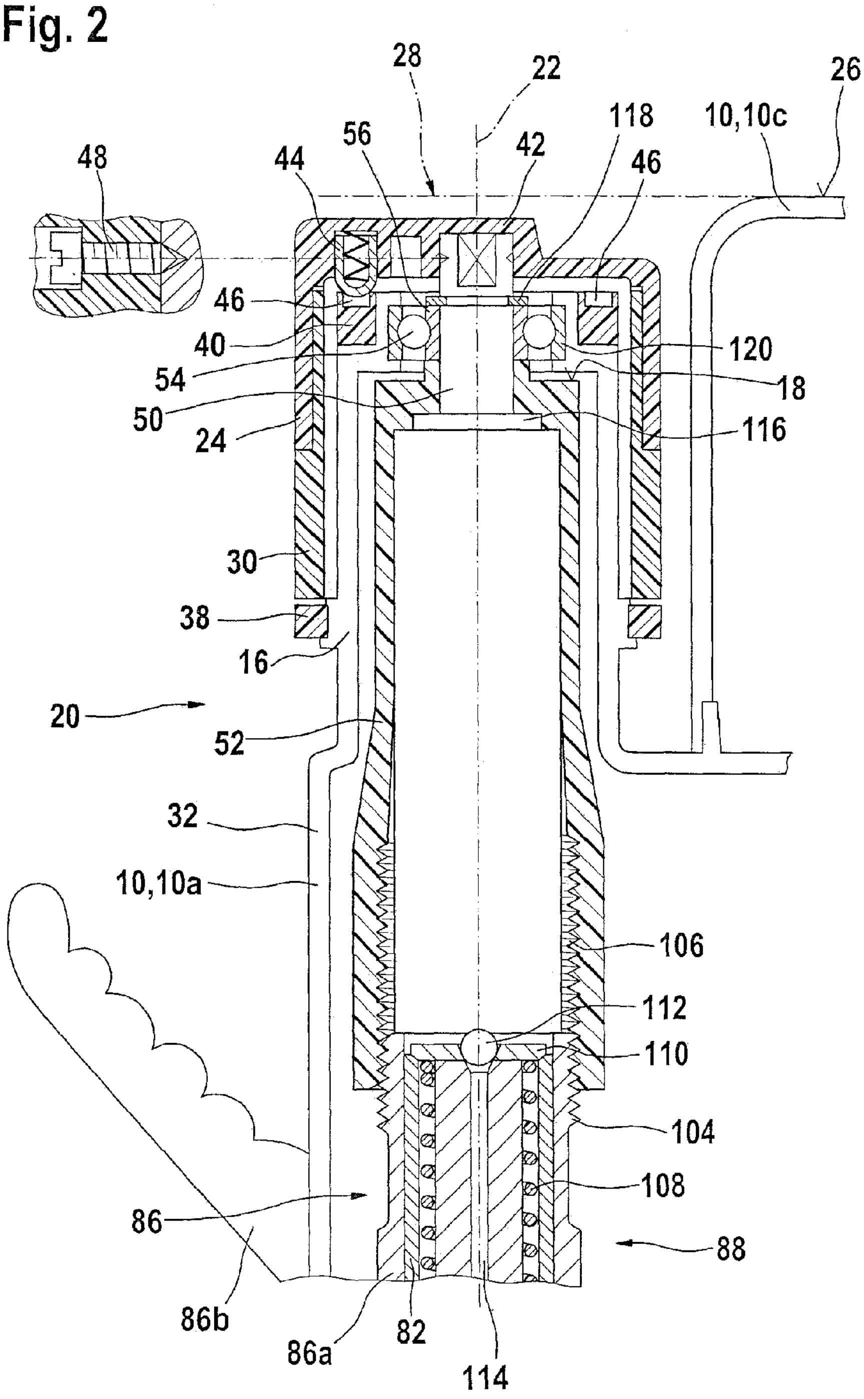
FIG. 2 shows a partial sectional view of the router with the device for making rough adjustments of the milling depth, which is located in the tower of the housing.

Device 88 for making rough adjustments of the milling depth includes a rotary plate 92 installed on base plate 74 with at least three adjusting screws 94, which serve as a stop for a rod 96 for making rough adjustments of the milling depth and which may be fixed in position using clamping unit 86, which is shown in greater detail in FIG. 2. Rod 96 is fixed in position using a fixing screw 98, which has been inserted in a screw thread in lower piece 10*b* of housing 10. To adjust the desired milling depth more easily, a scale 100 is provided on housing upper piece 10*a*, and a displaceable sliding element 102—which is preferably made of Plexiglas—with a marking line is mounted on rod 96.

As shown in FIG. 2, housing 10 is capable of being fixed in position relative to base plate 74 via clamping device 86 using a clamping screw 86*b*. Clamping device 86 is designed as a clamping sleeve 86*a* and is displaceably guided on main column 82. Clamping screw 86*b* is seated in a thread of clamping sleeve 86*a*—which extends nearly at a right angle to the axis of main column 82—such that it is capable of being pressed against clamping sleeve 86*a*.

The milling depth of the router is adjusted using rod 96 and rotary plate 92. The milling depth adjusted in this manner is often inexact, however. Since it may not always be possible to correct this inaccuracy by making rough adjustments with rod 96, a device for making fine adjustments is also provided.

A device 20 for making fine adjustments of the milling depth is therefore located in a tower 16 of housing 10 of the router. To this end, clamping sleeve 86*a* includes—in an upper region—an outer thread 104 on its outer circumference, onto which an inner thread 106 of a stepped adjusting element 52—which is hollow-cylindrical in the lower section and is preferably made of plastic—is screwed. Inner thread 106 has preload relative to outer thread 104, to eliminate thread play. This may be brought about, e.g., by using a slightly larger or smaller thread pitch, or by using a slightly overlapping thread profile.

A long spring 108 is located inside main column 82. Long spring 108 is supported on base plate 74—shown in FIG. 1—and is braced by adjusting element 52. Spring 108, which is designed as a compression spring, ensures that housing 10 is raised relative to base plate 74 when clamping screw 86*b* is open, thereby enabling a milling tool inserted in motor spindle 58 to emerge from the work piece. Compression spring 108 is braced by adjusting element 52, with a disk 11Q having a central projection 112 inserted between them. In the exemplary embodiment shown, projection 112 is designed as a ball inserted in disk 110. It rests in the center of the base of adjusting element 52. To this end, adjusting element 52—which is otherwise preferably made of plastic—may be reinforced with, e.g., an intermediate metal ply. A mandrel 114 extends downward and away from disk 110 and into compression spring 108; it prevents compression spring 108 from collapsing.

A central neck 50 is located at the upper end of adjusting element 52. Housing upper piece 10*a* rests on shoulder 18, which is formed at the transition of the hollow-cylindrical piece to neck 50. A bearing 54 is inserted between shoulder 18 and neck 50. Housing upper piece 10*a* is connected with adjusting element 52 without play. An adjusting knob 24 is connected with neck 50.

To design device 20 for adjusting the milling depth—which is located in tower 16 of housing 10—to be as space-saving as possible, it is provided according to the present invention that device 20 extends, at a maximum, to a plane 28 formed by a top side 26 of housing 10.

Adjusting knob 24 of device 20 encloses tower 16 at least partially, i.e., adjusting knob 24 is slipped over tower 16. Adjusting knob 24 includes a region for receiving a rotating scale ring 30. Rotating scale ring 30 is preferably attachable in the receiving region of adjusting knob 24 via a snap-in connection. Other types of fastening methods, e.g., a screw connection, are also feasible.

Housing 10 of the router is composed at least partially of two half-shells 32 and 34, which are capable of being joined together, parting plane 36 of which extends essentially in the direction of vertical axis 22 of the router. In the present exemplary embodiment, upper piece 10*a* of housing 10 is composed of two half shells 32, 34. Parting plane 36 of half shells 32, 34 extends through tower 16 of housing 10, in which device 20 for adjusting the milling depth is located. Tower 16 includes at least one region for receiving at least one clamping ring 38, 40.

To join two half shells 32, 34 on tower 16 when the router is assembled, the at least one clamping ring 38, 40 may be pressed onto tower 16. Clamping ring 38, 40 is preferably a round-wire snap ring or a plastic molded part. In the present exemplary embodiment, a first clamping ring 40 in an upper receiving region, and a second clamping ring 38 in a central receiving region may be pressed onto tower 16. First clamping ring 38 is located underneath adjusting knob 24. Second clamping ring 38 includes a scale zero line, which interacts with rotating scale ring 30 of adjusting knob 24. Both components 30, 38 have the same outer diameter.

Adjusting knob 24 includes a grip rib 42 on a top side. A spring-loaded ball bush 44 is installed underneath grip rib 42, which may be snapped into holes 46 that interact with tower 16. Holes 46 are advantageously located in first clamping ring 40. Adjusting knob 24 is connected via fastening means, e.g., a screw 48 or a spring (see FIG. 3), with neck 50 of adjusting element 52. Fastening means 48 are advantageously located underneath grip rib 42. A flat, shaped spring may be used as the spring.

Housing 10 is braced relative to adjusting element 52 of device 20 for adjusting the milling depth via a deep-groove ball bearing 54. Adjusting element is advantageously connected—with the absence of axial play—with neck 50 of device 20 via an inner ring 56 of deep-groove ball bearing 54 by the fact that inner ring 56 is pressed onto neck 50, so that adjusting element 52 presses on a collar 116 located on neck 50. Inner ring 56 is also braced by a snap ring 118, which is installed above inner ring 56. An outer ring 120 of deep-groove ball bearing 54 is held by housing 10 with a gentle axial press fit, thereby enabling deep-groove ball bearing 54 to be supported with no axial play.

The fine adjustment of the milling depth may be carried out using device 20 for making fine adjustments with the milling tool inserted in the work piece, without changing the rough setting of the milling depth. When adjusting knob 24 is rotated, the milling depth is changed by the amount indicated in tenths of millimeters on rotating scale ring 30. The resultant rotation of adjusting element 52 relative to clamping sleeve 86*a* fixedly connected with main column 82 and, therefore, base plate 74, results in housing 10—which is displaceably accommodated on guide columns 82, 84—being raised or lowered slighly, depending on the direction of rotation of adjusting knob 24.

It will be understood that each of the elements described above, or two or more together, may also find a useful application in other types of constructions differing from the type described above.

While the invention has been illustrated and described as embodied in a router, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A router, comprising a drive for rotating a milling tool about a vertical rotation axis;

a housing;

a tool fitting extending from an underside of said housing for holding the milling tool and connected with said drive;

a device for adjusting a milling depth located in a tower of said housing, said device having a longitudinal axis extending offset from and substantially in a direction of the vertical rotation axis of the router, said device extending, at a maximum, to a plane formed by a topmost side of said housing, wherein said housing includes two half-shells which are joined together with a substantially vertical parting plane that extends through said tower, and wherein said tower receives a clamping ring for holding the half-shells together, which clamping ring includes a scale zero line for interacting with a scale member of the device for indicating the depth.

2. A router as defined in claim 1, wherein said device includes an adjusting knob which encloses said tower at least partially.

3. A router as defined in claim 1, wherein the scale member comprises a rotating scale ring, said device having an adjusting knob which includes a region for receiving said rotating scale ring.

4. A router as defined in claim 1, wherein said clamping ring is located underneath the scale member.

5. A router as defined in claim 1, and further comprising a further clamping ring on the tower.

6. A router as defined in claim 1, wherein the scale member comprises a rotating scale ring, and the scale zero line of the clamping ring interacts with said rotating scale ring.

7. A router as defined in claim 1, and further comprising an adjusting knob which includes a grip rib.

8. A router as defined in claim 7, and further comprising a spring-loaded ball bush which is installed underneath said grip rib and is snappable into holes that interact with said tower.

9. A router as defined in claim 8, and further comprising a further clamping ring provided with said holes.

10. A router as defined in claim 1, wherein said device has a neck, and said device further comprising an adjusting knob which is connected with said neck of said device via an element selected from the group consisting of a screw and a spring.

11. A router as defined in claim 1, wherein said device for adjusting milling depth has an adjusting element; and further comprising a ball bearing, said housing being braced against said adjusting element of said device via said ball bearing.

12. A router as defined in claim 11, wherein said device has a neck, said adjusting element being connected with said neck of said device via an inner ring of said ball bearing.

13. A router as defined in claim 1, wherein said device for adjusting the milling depth is configured as a device for making fine adjustments of the milling depth.

* * * * *